(12) United States Patent
Hasegawa et al.

(10) Patent No.: US 11,808,080 B2
(45) Date of Patent: Nov. 7, 2023

(54) PRODUCTION METHOD OF GLASS PANEL UNIT

(71) Applicant: PANASONIC INTELLECTUAL PROPERTY MANAGEMENT CO., LTD., Osaka (JP)

(72) Inventors: Kazuya Hasegawa, Osaka (JP); Hiroyuki Abe, Osaka (JP); Haruhiko Ishikawa, Osaka (JP); Tasuku Ishibashi, Ishikawa (JP); Eiichi Uriu, Osaka (JP); Takeshi Shimizu, Osaka (JP); Masataka Nonaka, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 555 days.

(21) Appl. No.: 17/252,193

(22) PCT Filed: May 24, 2019

(86) PCT No.: PCT/JP2019/020613
§ 371 (c)(1),
(2) Date: Dec. 14, 2020

(87) PCT Pub. No.: WO2019/239846
PCT Pub. Date: Dec. 19, 2019

(65) Prior Publication Data
US 2021/0254396 A1 Aug. 19, 2021

(30) Foreign Application Priority Data

Jun. 15, 2018 (JP) ................................. 2018-114821

(51) Int. Cl.
*E06B 3/673* (2006.01)
*E06B 3/677* (2006.01)

(52) U.S. Cl.
CPC .......... *E06B 3/677* (2013.01); *E06B 3/67386* (2013.01)

(58) Field of Classification Search
CPC ............................ E06B 3/677; E06B 3/67386
See application file for complete search history.

(56) References Cited

U.S. PATENT DOCUMENTS

| 6,221,190 B1 | 4/2001 | Shimosato et al. |
| 2004/0035086 A1 | 2/2004 | Minaai et al. |

(Continued)

FOREIGN PATENT DOCUMENTS

| JP | H11-79768 A | 3/1999 |
| JP | 2013-121900 A | 6/2013 |

(Continued)

OTHER PUBLICATIONS

International Search Report and Written Opinion issued in International Patent Application No. PCT/JP2019/020613, dated Aug. 27, 2019; partial English translation.

*Primary Examiner* — Jeffry H Aftergut
(74) *Attorney, Agent, or Firm* — McDermott Will & Emery LLP

(57) ABSTRACT

The assembling step is a step of preparing an assembly. The setting step is a step of setting a plurality of holder installation areas along an outer peripheral edge of the peripheral wall. The determining step is a step of determining a first area in which the slit and the peripheral wall are not adjacent to each other in the first area and a second area in which the slit and the peripheral wall are adjacent to each other. The installation step is a step of providing a holder in the first area without providing the holder in the second area.

18 Claims, 13 Drawing Sheets

(56) References Cited

U.S. PATENT DOCUMENTS

| | | |
|---|---|---|
| 2006/0207217 A1 | 9/2006 | Minaai et al. |
| 2006/0207218 A1 | 9/2006 | Minaai et al. |
| 2018/0094475 A1 | 4/2018 | Naito et al. |

FOREIGN PATENT DOCUMENTS

| | | | |
|---|---|---|---|
| JP | 2016-69232 A | * | 5/2016 |
| JP | 2016-108799 A | | 6/2016 |
| JP | 2018-058709 A | | 4/2018 |
| WO | 01/96255 A1 | | 12/2001 |
| WO | WO-2016/051762 A1 | * | 4/2016 |
| WO | WO-2016/084382 A1 | * | 6/2016 |
| WO | WO-2017/043054 A1 | * | 2/2017 |
| WO | WO-2017/056416 A1 | * | 4/2017 |

* cited by examiner

PRODUCTION METHOD OF GLASS PANEL UNIT

CROSS-REFERENCE OF RELATED APPLICATIONS

This application is the U.S. National Phase under 35 U.S.C. § 371 of International Patent Application No. PCT/JP2019/020613, filed on May 24, 2019, which in turn claims the benefit of Japanese Application No. 2018-114821, filed on Jun. 15, 2018, the entire disclosures of which Applications are incorporated by reference herein.

TECHNICAL FIELD

The present disclosure relates to methods for producing glass panel units. Specifically, the present disclosure relates to a production method of a glass panel unit appropriate to a window or the like.

BACKGROUND ART

Patent Literature 1 discloses a production method of a glass panel unit including a pair of glass panels with a vacuum space formed therebetween. In the production method, a first plate class and a second plate glass (a pair of plate glasses) are disposed to face each other with a frame member (a peripheral wall) provided therebetween, and then, the frame member is melted by being heated, thereby hermetically bonding the first plate glass and the second plate glass together. At this time, an inside space surrounded by the first and second plate glasses and the frame member is divided by a partition into a first space and a second space. Then, the first space is evacuated through the second space in an evacuation step, so that the first space becomes a vacuum space.

In such a production method as described in Patent Literature 1, it is, however, assumed that to suppress positional displacement of the first plate glass and the second plate glass, a plurality of holders are provided along an outer peripheral edge of the peripheral wall before the peripheral wall is melted. In this case, the holders tend to be provided at the location of an air passage (slit) via which the first space is communicated to the second space. In such an aspect, the slit tends to be narrowed due to the holders before the evacuation step. Thus, the first space may not be satisfactorily evacuated in the evacuation step.

CITATION LIST

Patent Literature

Patent Literature 1: JP 2016-108799 A

Summary of Invention

It is an object of the present disclosure to provide a production method of a glass panel unit with a slit being less likely to be narrowed due to holders provided.

A production method of a glass panel unit according to one aspect of the present disclosure includes an assembling step, a setting step, a determining step, and an installation step. The assembling step is a step of preparing an assembly. The assembly includes a first glass pane, a second glass pane, a peripheral wall, an inside space, a partition, an evacuation port, and an air passage. The second glass pane faces the first glass pane. The peripheral wall is located between the first glass pane and the second glass pane. The peripheral wall has a frame shape. The inside space is surrounded by the first glass pane, the second glass pane, and the peripheral wall. The partition divides the inside space into a first space and a second space. The evacuation port connects the second space to an outside space. The air passage is configured such that the first space is evacuated through the evacuation port. The air passage has a slit. The slit is in contact with an inner peripheral edge of the peripheral wall and is disposed between the peripheral wall and the partition. The setting step is a step of setting a plurality of holder installation areas along an outer peripheral edge of the peripheral wall. The determining step is a step of determining that each of the plurality of holder installation areas is a first area or a second area. The slit and the peripheral wall are not adjacent to each other in the first area. The slit and the peripheral wall are adjacent to each other in the second area. The installation step is a step of providing a holder in the first area without providing the holder in the second area.

According to the present disclosure, the slit is less likely to be narrowed due to the holders provided.

DESCRIPTION OF EMBODIMENTS

1. Embodiment 1.1, Schema

The following embodiment relates to a production method of a glass panel unit, in particular, to a production method of a heat insulative glass panel unit.

Figure 1:
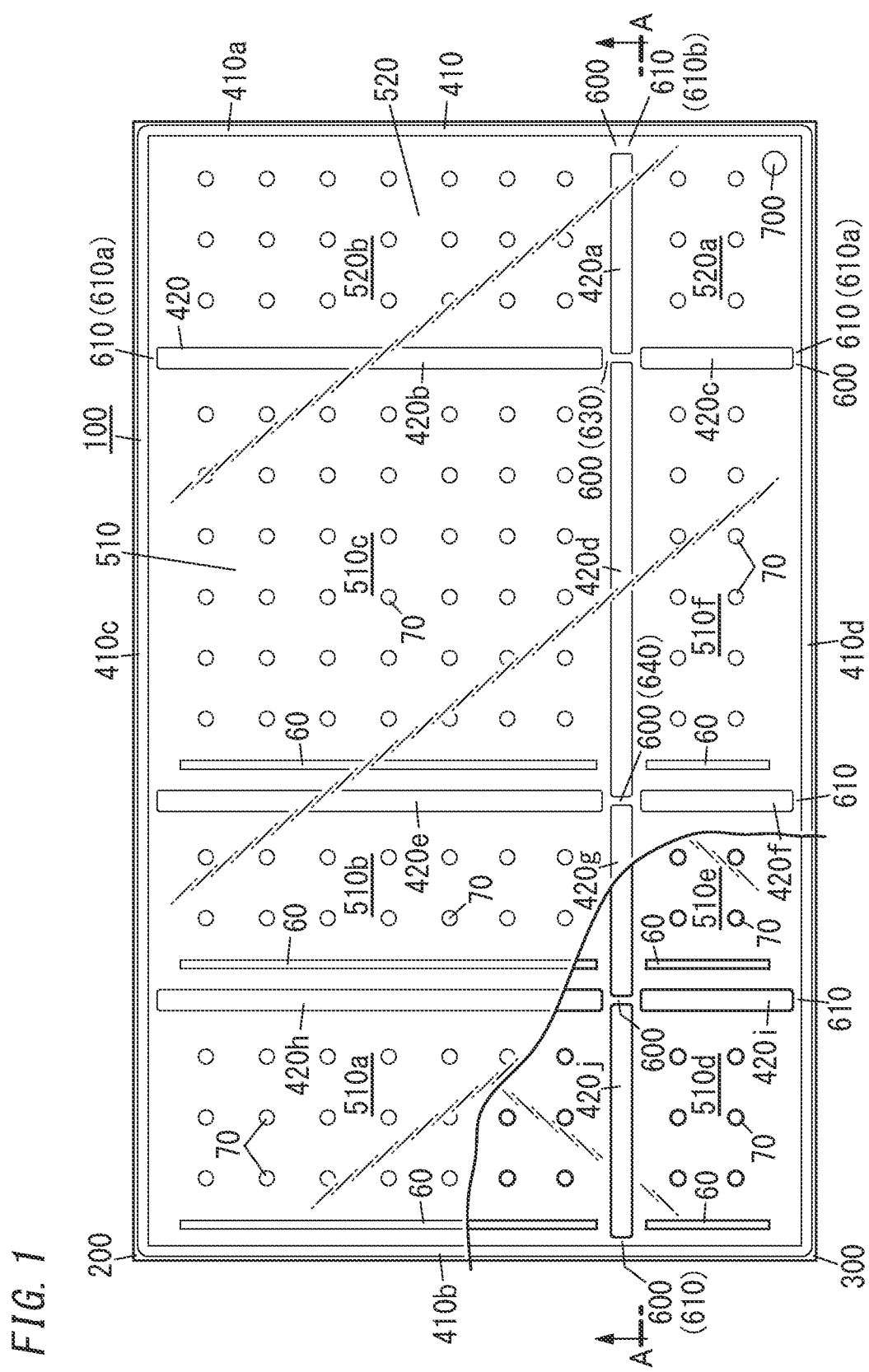
FIG. 1 is a plan view illustrating an assembly of a glass panel unit according to an embodiment.
Figure 2:
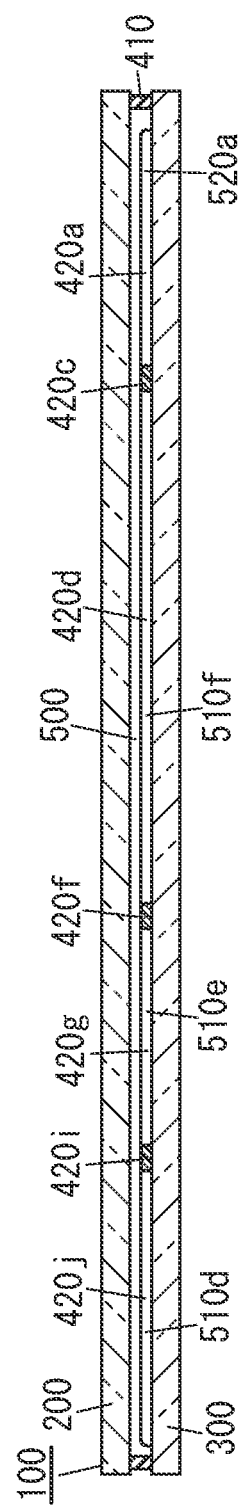
FIG. 2 is a sectional view along line A-A of FIG. 1.

FIGS. 1 and 2 show an assembly 100 of a glass panel unit according to the present embodiment (hereinafter also referred to simply as an "assembly"). From the assembly 100, one or more glass panel units (in the present embodiment, glass panel units 10A to 10F shown in FIG. 9) 10 are to be produced.

The assembly 100 includes a first glass pane 200, a second glass pane 300, a peripheral wall 410, an inside space 500, a partition 420 (partitions 420a to 420j), an evacuation port 700, and an air passage 600. The second glass pane 300 faces the first glass pane 200. The peripheral wall 410 is located between the first glass pane 200 and the second glass pane 300. The peripheral wall 410 has a frame shape. The inside space 500 is surrounded by the first glass pane 200, the second glass pane 300, and the peripheral wall 410. The partition 420 divides the inside space 500 into a first space 510 (first spaces 510a to 510f) and a second space 520 (second spaces 520a and 520b). The evacuation port 700 connects the second space 520 to the outside space. The air passage 600 is configured such that the first space 510 is evacuated through the evacuation port 700. The air passage 600 has a slit 610. The slit 610 is in contact with an inner peripheral edge of the peripheral wall 410 and is provided between the peripheral wall 410 and the partition 420.

In the assembly 100, the second space 520b is usable as part of an exhaust passage when the first space 510c is evacuated through the evacuation port 700. Thus, evacuation is efficiently performed.

1.2. Configuration

Figure 9:
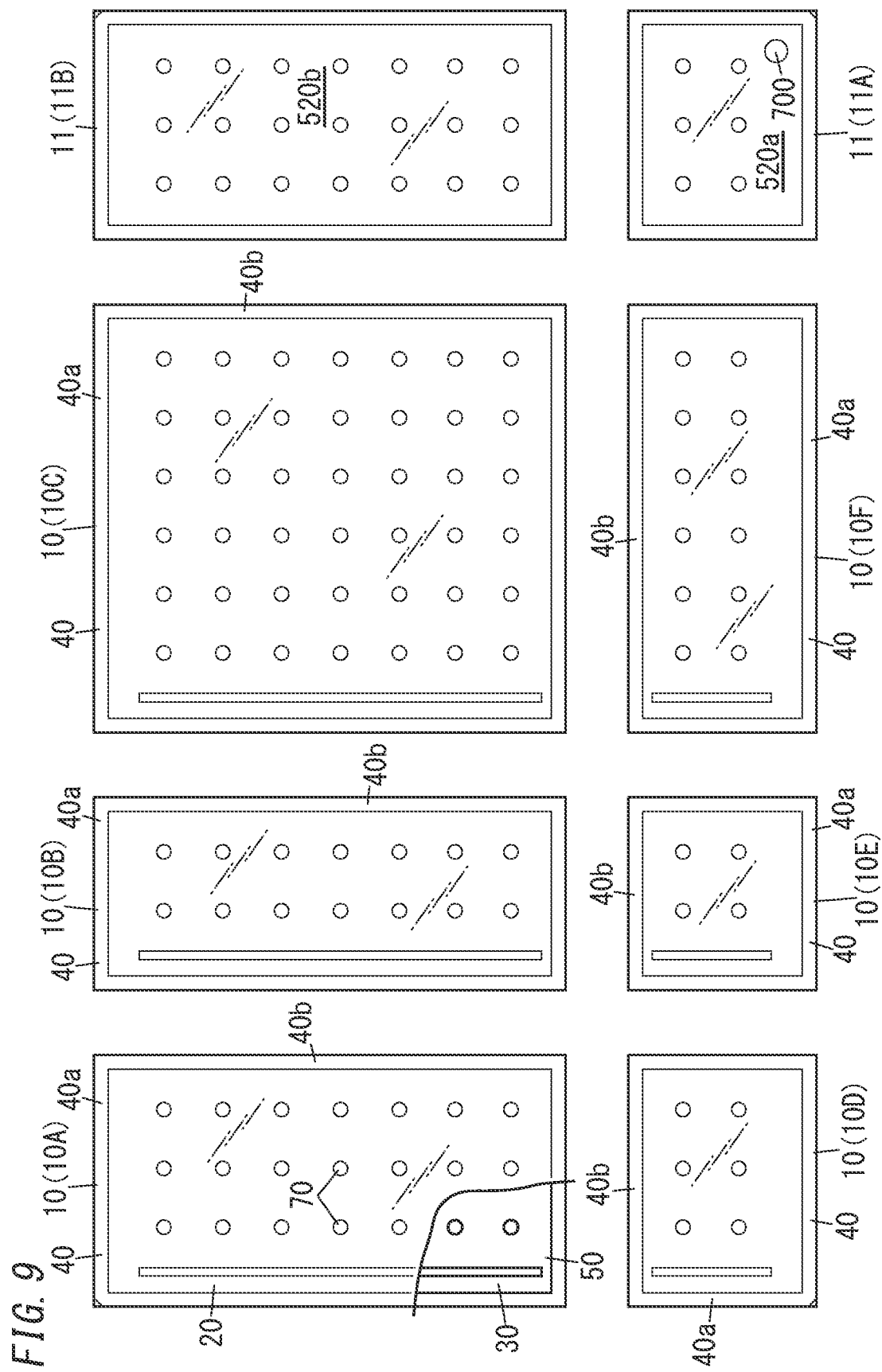
FIG. 9 is a view illustrating a removal step in the production method.

Next, the assembly 100 according to the present embodiment will be explained in detail. From the assembly 100, a plurality of glass panel units 10 are to be produced. For example, six glass panel units 10A to 10F as illustrated in FIG. 9 are to be produced from the assembly 100.

The glass panel unit 10 (10A to 10F) is a vacuum insulating glass unit. The vacuum insulating glass unit is an example of a multi-layer glass panel including at least a pair of glass panels. The vacuum insulating glass unit has a vacuum space between the pair of glass panels. As illustrated in FIG. 9, each of the glass panel units 10A to 10F includes a pair of glass panels (first and second glass panels) 20 and 30 and a frame member 40. Moreover, each of the glass panel units 10A to 10F has a space (vacuum space) 50 (50a to 50f (see FIG. 3)) surrounded by the first glass panel 20, the second glass panel 30, and the frame member 40. Each of the glass panel units 10A to 10F further includes a gas adsorbent 60 and a plurality of pillars (spacers) 70 in the vacuum space 50. Note that as can be seen from FIG. 9, the glass panel units 10A to 10F are quadrangular in plan view but do not necessarily have the same size or shape.

The first glass panel 20 has the same shape as the second glass panel 30. The first glass panel 20 and the second glass panel 30 each have a rectangular plate shape. Examples of a material for the first and second glass panels 20 and 30 include soda-lime glass, high strain-point glass, chemically tempered glass, no-alkali glass, quartz glass, Neoceram, and thermally tempered glass, Note that at least one glass panel of the first and second glass panels 20 and 30 has a surface provided with a coating. Examples of the coating include a transparent infrared reflective film. Note that the coating is not limited to the infrared reflective film but may be a film having a desired physical property.

The frame member 40 is disposed between the first glass panel 20 and the second glass panel 30 to hermetically bond the first glass panel 20 and the second glass panel 30 together. This forms a space surrounded by the first glass panel 20, the second glass panel 30, and the frame member 40. The space surrounded by the first glass panel 20, the second glass panel 30, and the frame member 40 is the vacuum space 50. The frame member 40 is made of a thermal adhesive (a bonding material). In other words, the frame member 40 is a cured thermal adhesive. The thermal adhesive is, for example, glass frit. Examples of the glass frit include low-melting-point glass frit. Examples of the low-melting-point glass frit include bismuth-based glass frit, lead-based glass frit, and vanadium-based glass frit. The frame member 40 has a polygonal (in the present embodiment, quadrangular) frame shape in a similar manner to the first and second glass panels 20 and 30. The frame member 40 is formed along outer perimeters of the first and second glass panels 20 and 30. Moreover, the thermal adhesive is not limited to the glass frit but may be, for example, low-melting-point metal or a hot-melt adhesive material.

The gas adsorbent 60 is disposed in the vacuum space 50. Specifically, the gas adsorbent 60 has an elongated flat plate shape and is disposed on the second glass panel 30. The gas adsorbent 60 is used to adsorb unnecessary gas (for example, remaining gas). The unnecessary gas is, for example, gas released from the thermal adhesive when the thermal adhesive is heated to form the frame member 40. The gas adsorbent 60 includes a getter. The getter is a material having a property of adsorbing molecules smaller than a prescribed size. The getter is, for example, an evaporable getter. The evaporable getter has a property of releasing adsorbed molecules at or higher than a predetermined temperature (activation temperature). Thus, even when the adsorption capacity of the evaporable getter decreases, heating the evaporable getter to or higher than the activation temperature enables the adsorption capacity of the evaporable getter to be recovered. The evaporable getter is, for example, zeolite or ion-exchanged zeolite (e.g., copper ion-exchanged zeolite). The gas adsorbent 60 contains powder of the getter. Specifically, the gas adsorbent 60 is formed by applying and solidifying a liquid containing powder of the getter (e.g., a dispersion obtained by dispersing powder of the getter in a liquid, or a solution obtained by dissolving powder of the getter in a liquid). In this case, the gas adsorbent 60 can be downsized. Thus, even when the vacuum space 50 is small, the gas adsorbent 60 can be disposed.

The plurality of pillars 70 are disposed in the vacuum space 50. The plurality of pillars 70 are adopted to maintain a prescribed gap between the first glass panel 20 and the second glass panel 30, That is, the plurality of pillars 70 are used to maintain a desired distance between the first glass panel 20 and the second glass panel 30. Note that, sizes of the pillars 70, the number of the pillars 70, the interval between the pillars 70, and the arrangement pattern of the pillars 70 may be accordingly selected. Each pillar 70 has a cylindrical shape having substantially the same height as the prescribed gap. For example, each pillar 70 has a diameter of 1 mm and a height of 100 μm. Note that each pillar 70 may have a desired shape such as a prism shape or a spherical shape.

As illustrated in FIGS. 1 and 2, the assembly 100 includes the first glass pane 200, the second glass pane 300, the peripheral wall 410, the inside space 500, the partition 420 (420a to 420j), and a plurality of air passages 600, and the evacuation port 700. Moreover, the assembly 100 includes a plurality of gas adsorbents 60 and the plurality of pillars (spacers) 70.

The first glass pane (a first plate glass) 200 is a member serving as a base of the first glass panel 20 and is made of the same material as the first glass panel 20. The second glass pane (a second plate glass) 300 is a member serving as a base of the second glass panel 30 and is made of the same material as the second glass panel 30. The first and second glass panes 200 and 300 have the same shape. The first and second glass panes 200 and 300 each have a polygonal (in the present embodiment, rectangular) plate shape. In the present embodiment, the first glass pane 200 has a size that allows the first glass panels 20 of the glass panel units 10A to 10F to be formed, and the second glass pane 300 has a size that allows the second glass panels 30 of the glass panel units 10A to 10F to be formed.

The peripheral wall 410 is made of a bonding material (a first bonding material).

The first bonding material includes, for example, a thermal adhesive. The thermal adhesive is, for example, glass frit. The glass frit is, for example, low-melting-point glass fit. Examples of the low-melting-point glass frit include bismuth-based glass frit, lead-based glass frit, and vanadium-based glass frit. Moreover, the first bonding material includes a core material. The core material is used to determine the height of the frame member 40. The core material is, for example, spherical glass beads. The diameter of the glass beads is selected in accordance with the height of the frame member 40. The core material is dispersed in the thermal adhesive at a prescribed ratio. For example, the content of glass beads having a diameter of 50 μm to 300 pin in the thermal adhesive is 0.01 wt. % to 1 wt. (0.03% to 3% in the volume ratio).

The peripheral wall 410 is located between the first glass pane 200 and the second glass pane 300. As illustrated in FIG. 1, the peripheral wall 410 has a frame shape, in particular, the peripheral wall 410 has a rectangular frame shape. The peripheral wall 410 is formed along the outer perimeters of the first and the second glass panes 200 and 300. The peripheral wall 410 includes the first side to fourth sides 410a, 410b, 410c, and 410d. The first and second sides 410a and 410h extend along a width direction (upward/downward direction in FIG. 1) of the first and second glass panes 200 and 300. The third and fourth sides 410c and 410d extend along a length direction (leftward/rightward direction in FIG. 1) of the first and second glass panes 200 and 300. The peripheral wall 410 is configured to hermetically bond the first glass pane 200 and the second glass pane 300 together. Thus, in the assembly 100, the inside space 500 surrounded by the peripheral wall 410, the first glass pane 200, and the second glass pane 300 is formed.

The partitions 420a to 420j are made of a bonding material (a second bonding material). The second bonding material includes, for example, a thermal adhesive. The thermal adhesive is, for example, glass frit. The glass frit is, for example, low-melting-point glass fit. Examples of the low-melting-point glass frit include bismuth-based glass frit, lead-based glass frit, and vanadium-based glass frit. In the present embodiment, the thermal adhesive of the partitions 420a to 420j is the same as the thermal adhesive of the peripheral wall 410. Thus, the partitions 420a to 420j and the peripheral wall 410 have the same softening point. Moreover, the second bonding material has the same core material as the first bonding material. Also in the second bonding material, the core material is dispersed in the thermal adhesive at a prescribed ratio. Fax example, the content of glass beads having a diameter of 50 μm to 300 μm in the thermal adhesive is 0.01 wt. % to 1 wt. % (0.03% to 3% in the volume ratio).

The inside space 500 is a space surrounded by the first glass pane 200, the second glass pane 300, and the peripheral wall 410.

The partitions 420a to 420j divide the inside space 500 into the first spaces 510a to 510f and the second spaces 520a and 520b. In the assembly 100, the first spaces 510a to 510f are spaces (evacuation spaces) to be evacuated later, and the second spaces 520a and 520b are spaces used to evacuate the first space 510.

As illustrated in FIG. 1, the partitions 420a to 420j are located in an area surrounded by the peripheral wall 410.

Then, each of the partitions 420a to 420j is lower than the peripheral wall 410. Thus, as illustrated in FIG. 2, the peripheral wall 410 first comes into contact with both the first and second glass panes 200 and 300 before the partitions 420a to 420j come into contact with the first and second glass panes 200 and 300. In the example shown in FIG. 2, the partitions 420a to 420j are formed on the second glass pane 300 and are thus apart from the first glass pane 200. Therefore, even when at least one of first and second glass panes 200 and 300 warps and the distance between the first glass pane 200 and second glass pane 300 is shorter at a central part than at a peripheral portion thereof, the partitions 420a to 420j are less likely to come into contact with the first and second glass panes 200 and 300, This reduces the possibility that the peripheral wall 410 is inhibited by the partitions 420a to 420j from coming into contact with both the first and second glass panes 200 and 300. This leads to a reduction in the occurrence of a bonding defect between the first and second glass panes 200 and 300. Thus, the yield is increased.

Specifically, the partitions 420b and 420c have an elongated shape along the width direction (the upward/downward direction in FIG. 1) of the first and second glass panes 200 and 300 and are aligned in a line at an interval in the width direction. Moreover, the partitions 420b and 420c are located on a first end side (the right side in FIG. 1) in the length direction (the rightward/leftward direction in FIG. 1) of the first and second glass panes 200 and 300 and are disposed at an interval from the first side 410a of the peripheral wall 410.

The partitions 420e and 420f have an elongated shape along the width direction of the first and second glass panes 200 and 300 and are aligned in a line at an interval in the width direction. Moreover, the partitions 420e and 420f are located closer to a second end side (the left side in FIG. 1) in the length direction of the first and second glass panes 200 and 300 than the partitions 420b and 420c are. Moreover, the partitions 420e and 420f respectively face the partitions 420b and 420c in the length direction of the first and second glass panes 200 and 300.

The partitions 420h and 420i have an elongated shape along the width direction of the first and second glass panes 200 and 300 and are aligned in a line at an interval in the width direction. Moreover, the partitions 420h and 420i are located closer to a second end side (the left side in FIG. 1) in the length direction of the first and second glass panes 200 and 300 than the partitions 420e and 420f are. Moreover, the partitions 420h and 420i respectively face the partitions 420e and 420f in the length direction of the first and second glass panes 200 and 300.

The partitions 420a, 420d, 420g, 420j have an elongated shape along the length direction of the first and second glass panes 200 and 300 and are aligned in a line at an interval in the length direction. The partition 420a has a first end (a left end in FIG. 1) located between the partitions 420b and 420c and a second end (a left end in FIG. 1) adjacent to the first side 410a of the peripheral wall 410 via the air passage 600. The partition 420d has a first end (a right end in FIG. 1) located between the partitions 420b and 420c and a second end (a left end in FIG. 1) located between the partitions 420e and 420f The partition 420g has a first end (a right end in FIG. 1) located between the partitions 420e and 420f and a second end (a left end in FIG. 1) located between the partitions 420h and 420i. The partition 420j has a first end (a left end in FIG. 1) located between the partitions 420h and 420*i* and a second end (a left end in FIG. 1) adjacent to the second side 410*h* of the peripheral wall 410 via the air passage 600.

In the assembly 100, the first space 510*a* is a space surrounded by the second and third sides 410*b* and 410*c* of the peripheral wall 410 and the partitions 420*h*, 420*i*, and 420*j*. The first space 510*b* is a space surrounded by the third side 410*c* of the peripheral wall 410 and the partitions 420*e*, 420*g*, and 420*h*. The first space 510*c* is a space surrounded by the third side 410*c* of the peripheral wall 410 and the partitions 420*b*, 420*d*, and 420*e*. The first space 510*d* is a space surrounded by the second and fourth sides 410*b* and 410*d* of the peripheral wall 410 and the partitions 420*i* and 420*j*, The first space 510*e* is a space surrounded by the fourth side 410*d* of the peripheral wall 410 and the partitions 420*f*, 420*e*, and 420*i*. The first space 510*f* is a space surrounded by the fourth side 410*d* of the peripheral wall 410 and the partitions 420*c*, 420*d*, and 420*f*. The second space 520*a* is a space surrounded by the first and fourth sides 410*a* and 410*d* of the peripheral wall 410 and the partitions 420*a* and 420*c*. The second space 520*b* is a space surrounded by the first and third sides 410*a* and 410*c* of the peripheral wall 410 and the partitions 420*a* and 420*h*.

Here, the gas adsorbent 60 is disposed in each of the first spaces 510*a* to 510*f* as illustrated in FIG. 1. In contrast, the plurality of pillars 70 are disposed in the entirety of the inside space 500 (the first spaces 510*a* to 510*f* and the second spaces 520*a* and 520*h*) as illustrated in FIG. 1.

The plurality of air passage 600 are used to evacuate the first spaces (evacuation spaces) 510*a* to 510*f* through the evacuation port 700. The first spaces 510*a* to 510*f* are connected to the second spaces 520*a* and 520*b* via the plurality of air passages 600 (directly or indirectly). In the present embodiment, the partitions 420*a* to 420*j* are disposed not to be in contact with each other. Gaps between the partitions 420*a* to 420*j* form the air passages 600. The air passages 600 are closed by once melting and deforming the partitions 420*a* to 420*j*. Thus, at least the first space 510*a* to 510*f* are (hermetically) separated from one another, and the first spaces 510*a* to 510*f* are (hermetically) separated from the second spaces 520*a* and 520*b* (see FIG. 3).

The evacuation port 700 connects the second spaces 520*a* and 520*b* to the outside space. In particular, the evacuation port 700 is a pore through which the second space 520*a* is communicated with the outside space. The evacuation port 700 is used to evacuate the first spaces 510*a* to 510*f* through the second spaces 520*a* and 520*b* and the air passages 600. Thus, the air passages 600, the second spaces 520*a* and 520*b*, and the evacuation port 700 form an exhaust passage to evacuate the first spaces 510*a* to 510*f*. The evacuation port 700 is formed in the second glass pane 300 to connect the second space 520*a* and the outside space. Specifically; the evacuation port 700 is located at a corner of the second glass pane 300.

In the present embodiment, the second space 520*a* is a vent space directly communicated with the evacuation port 700. The second space 520*b* is not directly communicated with the evacuation port 700 but form a connection space that connects the first space 510*c* to the second space 520*a*.

The plurality of air passages 600 have a plurality of slits 610. The plurality of slits 610 are in contact with an inner peripheral edge of the peripheral wall 410 and are provided between the peripheral wall 410 and each of the partitions 420*a* to 420*j*. The plurality of slits 610 include a plurality of (in the present embodiment, two) first slits 610*a* that connect the first spaces 510*c* and 510*f* to the second spaces 520*a* and 520*b* respectively. Moreover, the plurality of slits 610 include a second slit 610*b* through which the second spaces 520*a* and 520*b* are communicated with each other. Here, the second slit 610*b* is wider than each of the first slits 610*a*. Thus, the second space 520*b* is usable as part of an exhaust passage when the first spaces 510*a* to 510*f* are evacuated through the evacuation port 700. Thus, evacuation is efficiently performed. In particular, it is possible to reduce the possibility that when the partitions 420*a* to 420*j* are deformed to close the air passages 600 in a second melting step (a sealing step) described later, the second slit 610*b* is closed before all the first slits 610*a* are closed. Thus, it is possible to reduce the possibility that the first space 510*c* is separated from the second space 520*a* before the first space 510*c* is satisfactorily evacuated. Thus, the yield is increased.

1.3. Production Method

Next, a production method of the glass panel unit 10 (10A to 10F) from the assembly 100 will be described with reference to FIGS. 3 to 10. The production method of the glass panel unit 10 includes a preparation step and a removal step.

The preparation step is a step of preparing a work in process (hereinafter also referred to as a "work in process") 110 of a glass panel unit shown in FIGS. 3 and 4. The work in process 110 is formed from the assembly 100.

Figure 3:
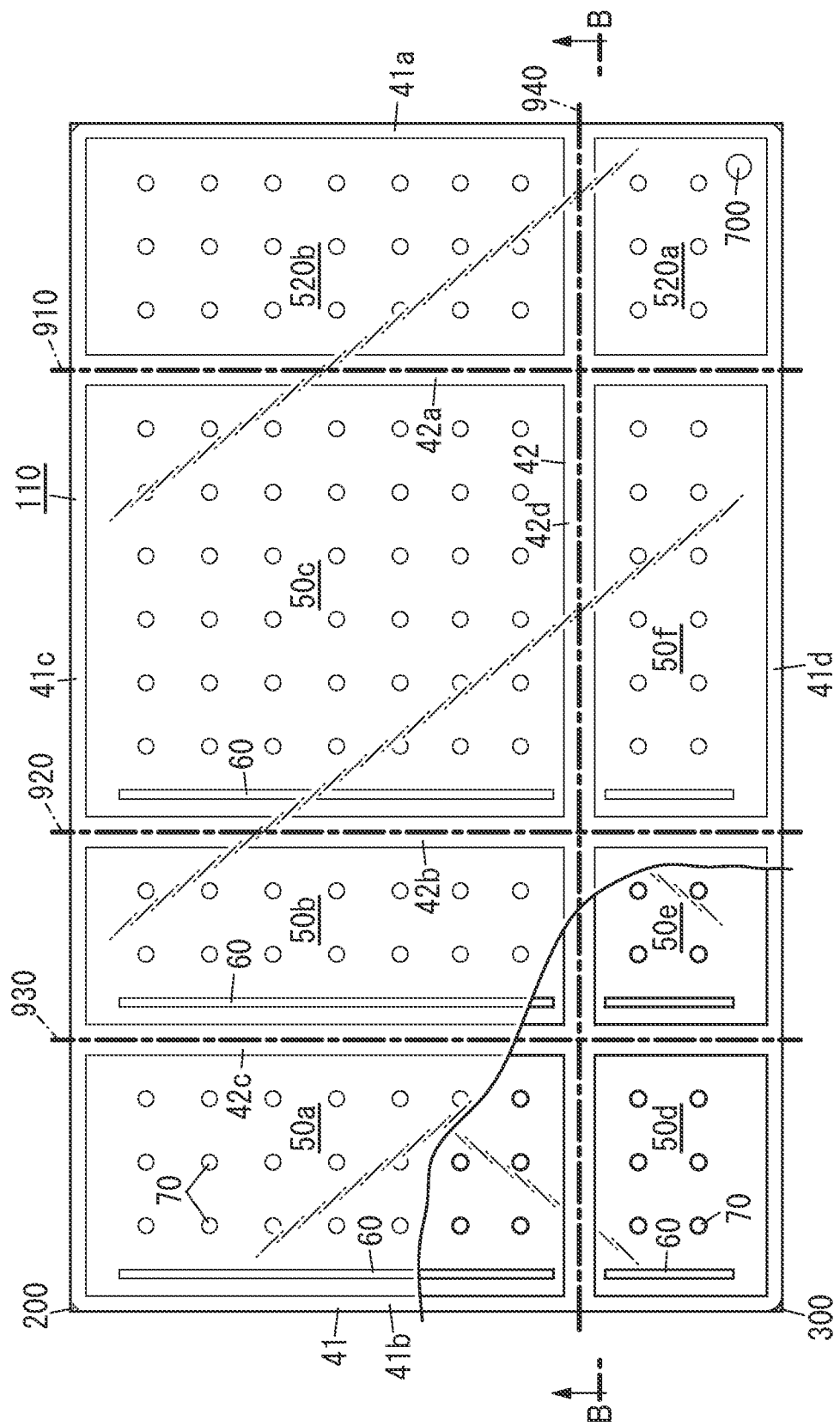
FIG. 3 is a plan view illustrating a work in progress of the glass panel unit according to the embodiment.
Figure 4:
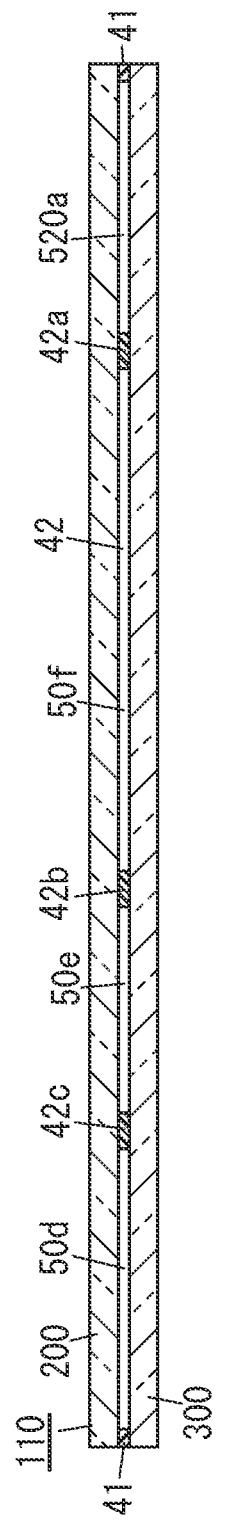
FIG. 4 is a sectional view along line B-B of FIG. 3.

As illustrated in FIGS. 3 and 4, the work in process 110 includes the pair of glass panes (the first and second glass panes) 200 and 300, the peripheral wall 41, and partitions 42*a* to 42*d*. Moreover, the work in process 110 includes the vacuum spaces 50*a* to 50*f* and the second spaces 520*a* and 520*b*. In addition, the work in process 110 includes the gas adsorbent 60 and the plurality of pillars (spacers) 70 in each of the vacuum spaces 50*a* to 50*f*. The work in process 110 further has the evacuation port 700.

The peripheral wall 41 is located between first and second glass panes 200 and 300 and hermetically bonds the first and second glass panes 200 and 300 together. The peripheral wall 41 is formed by once melting and then solidifying the peripheral wall 410 of the assembly 100. The peripheral wall 41 of the work in process 110 has a frame shape in a similar manner to the peripheral wall 410 of the assembly 100. In particular, the peripheral wall 41 includes first side to fourth sides 41*a*, 41*b*, 41*c*, and 41*d*. The first and second sides 41*a* and 41*b* extend along the width direction (the upward/downward direction in FIG. 3) of the first and second glass panes 200 and 300, The third and fourth sides 41*c* and 41*d* extend along the length direction (the leftward/rightward direction in FIG. 3) of the first and second glass panes 200 and 300.

The partitions 42*a* to 42*d* (spatially) separates the vacuum spaces 50*a* to 50*f* and the second spaces 520*a* and 520*b* from one another. The partitions 42*a* to 42*d* are formed from the partitions 420*a* to 420*j*. Specifically, the partition 42*a* has a straight-line shape extending in the width direction of the first and second glass panes 200 and 300 and integrally connects the third and fourth sides 41*c* and 41*d* of the peripheral wall 41 to each other. The partition 42*b* has a straight-line shape extending in the width direction of the first and second glass panes 200 and 300 and integrally connects the third and fourth sides 41*c* and 41*d* of the peripheral wall 41 to each other. The partition 42*b* faces the partition 42*a* in the length direction of the first and second glass panes 200 and 300. The partition 42*c* has a straight-line shape extending in the width direction of the first and second glass panes 200 and 300 and integrally connects the third and fourth sides 41*c* and 41*d* of the peripheral wall 41 to each other. The partition 42*c* faces the partition 42*h* in the length direction of the first and second glass panes 200 and 300. The partition 42d has a straight-line shape extending in the length direction of the first and second glass panes 200 and 300 and integrally connects the first and second sides 41a and 41b of the peripheral wall 41 to each other. The partition 42d intersects the partitions 42a to 42c.

The partition 42a is formed by deforming the partitions 420a, 420b, 420c, and 420d. The partition 42h is formed by deforming the partitions 420d, 420e, 420f, and 420g. The partition 42c is formed by deforming the partitions 420g, 420h, 420i, and 420j. The partition 42d is formed by deforming the partitions 420a to 420j.

The vacuum spaces 50a to 50f are formed by respectively evacuating the first spaces 510a, to 510f through the second spaces 520a and 520h and the evacuation port 700. In other words, the vacuum spaces 50a to 50f are the first spaces 510a to 510f in which the degree of vacuum is lower than or equal to a prescribed value. The prescribed value is, for example, 0.1 Pa. The vacuum spaces 50a to 50f are fully sealed with the first glass pane 200, the second glass pane 300, the peripheral wall 41, and the partitions 42a to 42d and are thus separated from the second spaces 520a and 520b and the evacuation port 700.

In the work in process 110, the vacuum space 50a (the first space 510a) is a space surrounded by the second and third sides 41b and 41c of the peripheral wall 41 and the partitions 42c and 42d. The vacuum space Sob (the first space 510b) is a space surrounded by the third side 41c of the peripheral wall 41 and the partitions 42b, 42c, and 42d. The vacuum space 50c (the first space 510c) is a space surrounded by the third side 41c of the peripheral wall 41 and the partitions 42a, 42b, and 42d. The vacuum space 50d (the first space 510d) is a space surrounded by the second and fourth sides 41b and 41d of the peripheral wall 41 and the partitions 42c and 42d. The vacuum space 50e (the first space 510e) is a space surrounded by the fourth side 41d of the peripheral wall 41 and the partitions 42b, 42c, and 42d. The vacuum space 50f (the first space 5101) is a space surrounded by the fourth side 41d of the peripheral wall 410 and the partitions 42a, 42b, and 42d.

Thus, the peripheral wall 41 and the partitions 42a to 42d integrally include a plurality of frame members 40 each surrounding a corresponding one of the vacuum spaces 50a to 50f (e.g., see FIG. 9). That is, of the peripheral wall 41 and the partitions 42a to 42d, each portion surrounding the corresponding one of the vacuum spaces 50a to 50f forms the frame member 40.

The preparation step is a step of preparing the above-described work in process 110 and includes the assembling step, the setting step, the determining step, the installation step, a first melting step, an evacuation step, and the second melting step.

Figure 5:
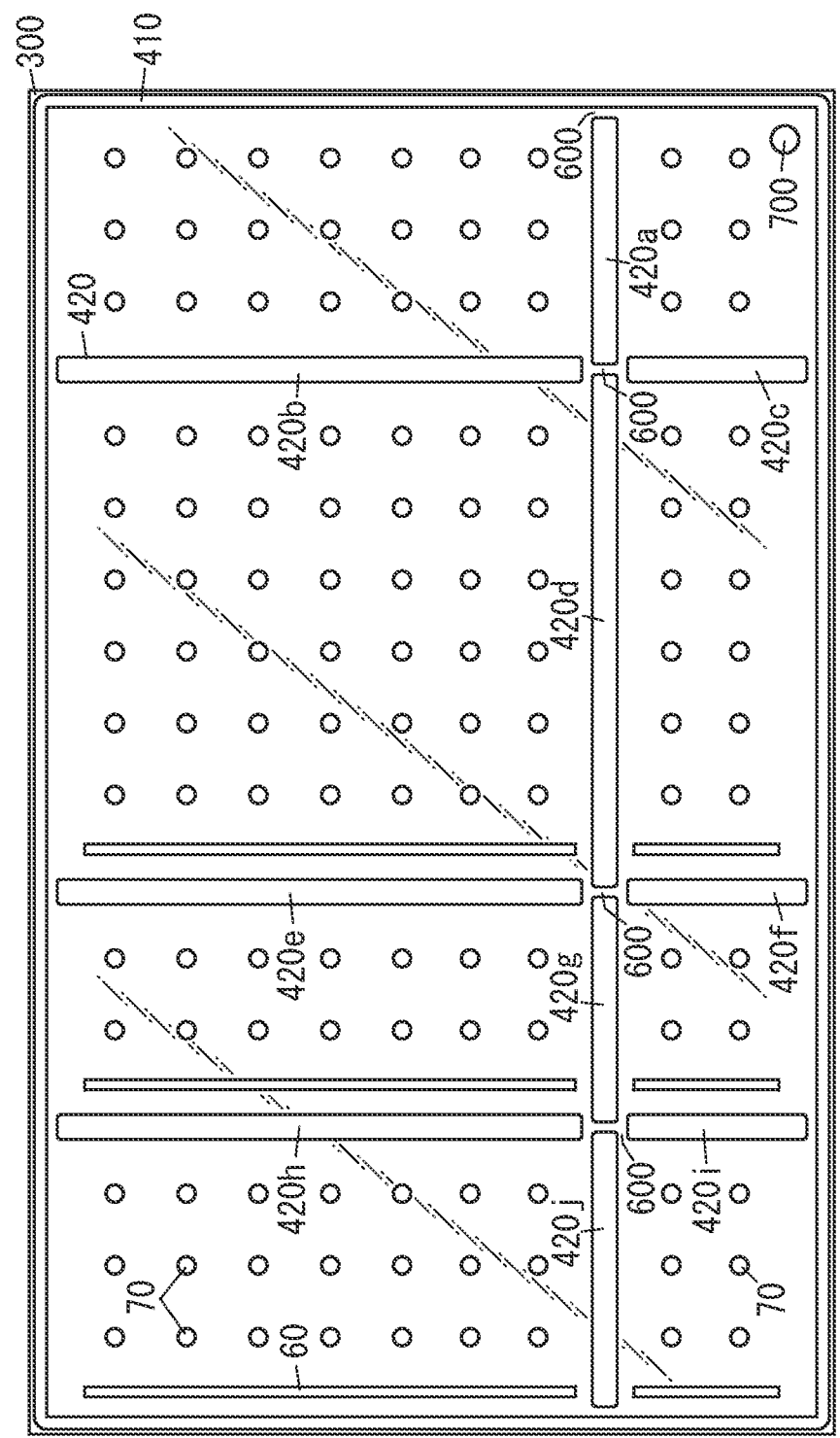
FIG. 5 is a view illustrating an assembling step in a production method of the glass panel unit according to the embodiment.

The assembling step is a step of preparing the assembly 100. That is, in the assembling step, for example, as illustrated in FIG. 5, the peripheral wall 410, the partitions 420a to 420j, the inside space 500, the air passage 600, the evacuation port 700, the plurality of gas adsorbents 60, and the plurality of pillars 70 are formed on the second glass pane 300. Thereafter, the first glass pane 200 is disposed to face the second glass pane 300, and the first glass pane 200 is brought into contact with the peripheral wall 410. Thus, the assembly 100 as illustrated in FIG. 1 is formed.

The peripheral wall 410 is formed by applying a material (a first bonding material) therefor onto one of the first and second glass panes 200 and 300 with an arbitrary application apparatus such as a dispenser.

The partitions 420a to 420j are formed by applying a material (a second bonding material) therefor onto one of the first and second glass panes 200 and 300 with an arbitrary application apparatus such as a dispenser.

During the assembling step, a step (evacuation port forming step) of forming the evacuation port 700 may be performed. The evacuation port 700 is formed, for example, in the second glass pane 300. After the evacuation port forming step, the first and second glass panes 200 and 300 are washed as necessary. Moreover, the evacuation port forming step may be performed before the peripheral wall 410 and the partitions 420a to 420j are formed.

In the assembling step, the plurality of pillars 70 are prepared in advance, A chip mounter or the like is used to arrange the plurality of pillars 70 at prescribed locations on the second glass pane 300. Here, the pillars 70 are shorter than the partitions 420a to 420j. Note that the plurality of pillars 70 may be formed by a photolithography technique and an etching technique. In this case, the plurality of pillars 70 are made of, for example, a photocurable material. Alternatively, the plurality of pillars 70 may be formed by a well-known thin film forming technique.

The gas adsorbent 60 is formed by applying a solution containing powder of a getter dispersed therein onto a predetermined location on the second plate glass 300 with a dispenser or the like and drying the solution.

The above-described assembling step provides the assembly 100. Then, after the assembling step, the setting step, the determining step, the installation step, the first melting step (the bonding step), the evacuation step, and the second melting step (the sealing step) are performed.

Figure 6:
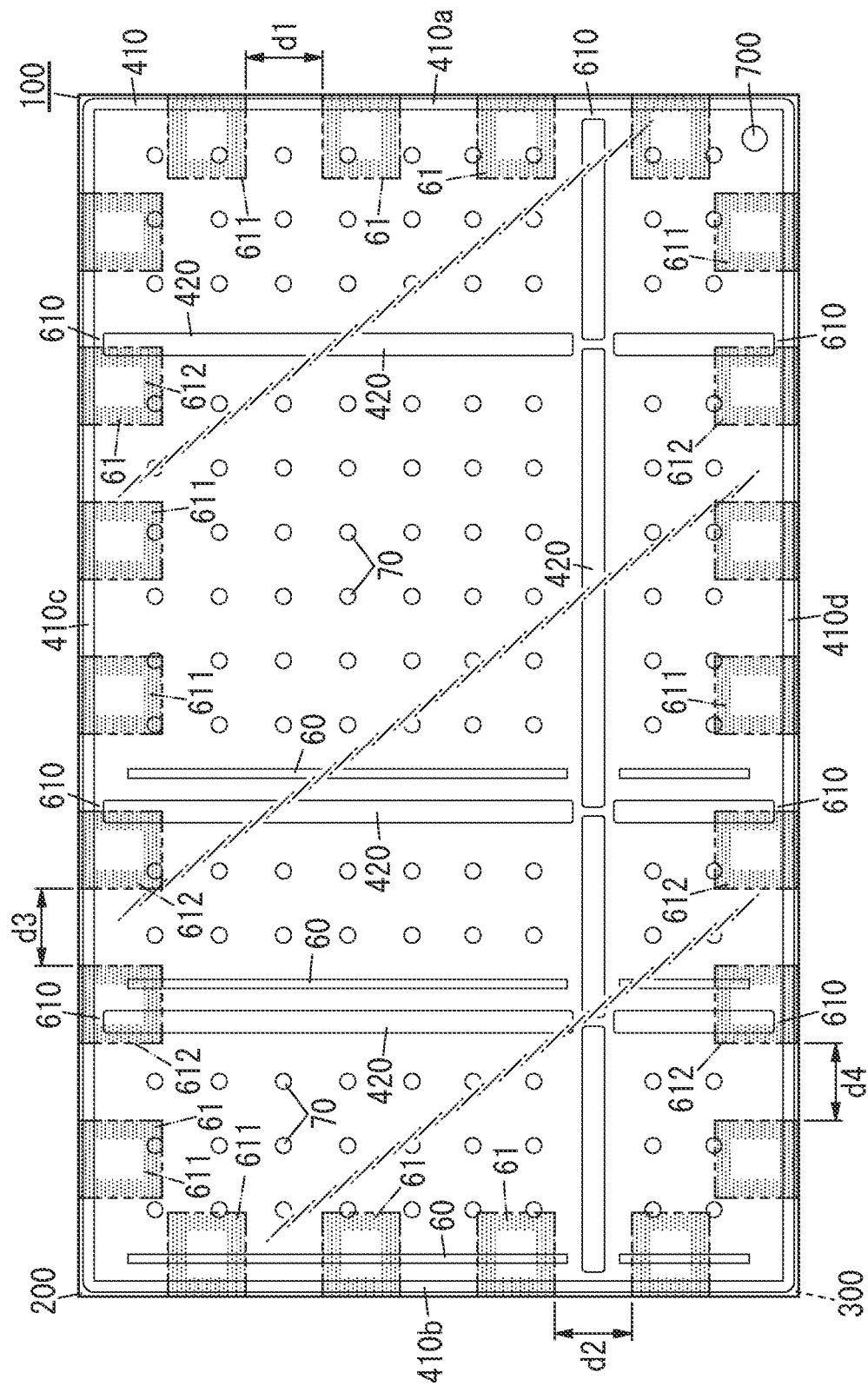
FIG. 6 is a view illustrating a setting step and a determining step in the production method.

The setting step is a step of setting a plurality of holder installation areas 61 along an outer peripheral edge of the peripheral wall 410. In the example of FIG. 6, the holder installation areas 61 are set at 22 locations. The holder installation areas 61 are areas set before the installation step (installation of holders 62 which will be described later) regardless of the slits 610. As illustrated in FIG. 6, the holder installation areas 61 are equidistantly spaced on each side of the peripheral wall 410. In this case, the locations of the holder installation areas 61 are efficiently set. The plurality of holder installation areas 61 are set on an outer surface of one of the first and second glass panes 200 and 300 with a jig or the like for determining the location of each holder installation area 61.

More specifically, on the first side 410a, the plurality of holder installation areas 61 are set to be equidistantly spaced from each other by a prescribed distance (a first prescribed space) d1, On the second side 410b, the plurality of holder installation areas 61 are set to be equidistantly spaced from each other by a prescribed distance (a second prescribed space) d2. On the third side 410c, the plurality of holder installation areas 61 are set to be equidistantly spaced from each other by a prescribed distance (a third prescribed space) d3. On the fourth side 410d, the plurality of holder installation areas 61 are set to be equidistantly spaced from each other by a prescribed distance (a fourth prescribed space) d4, In this case, when the plurality of holder installation areas 61 are set to be equidistantly spaced from each other another on each of the first side 410a to fourth side 410d, the first to fourth prescribed spaces d1 to d4 may be the same or may be different.

After the setting step, the determining step is performed.

Figure 7:
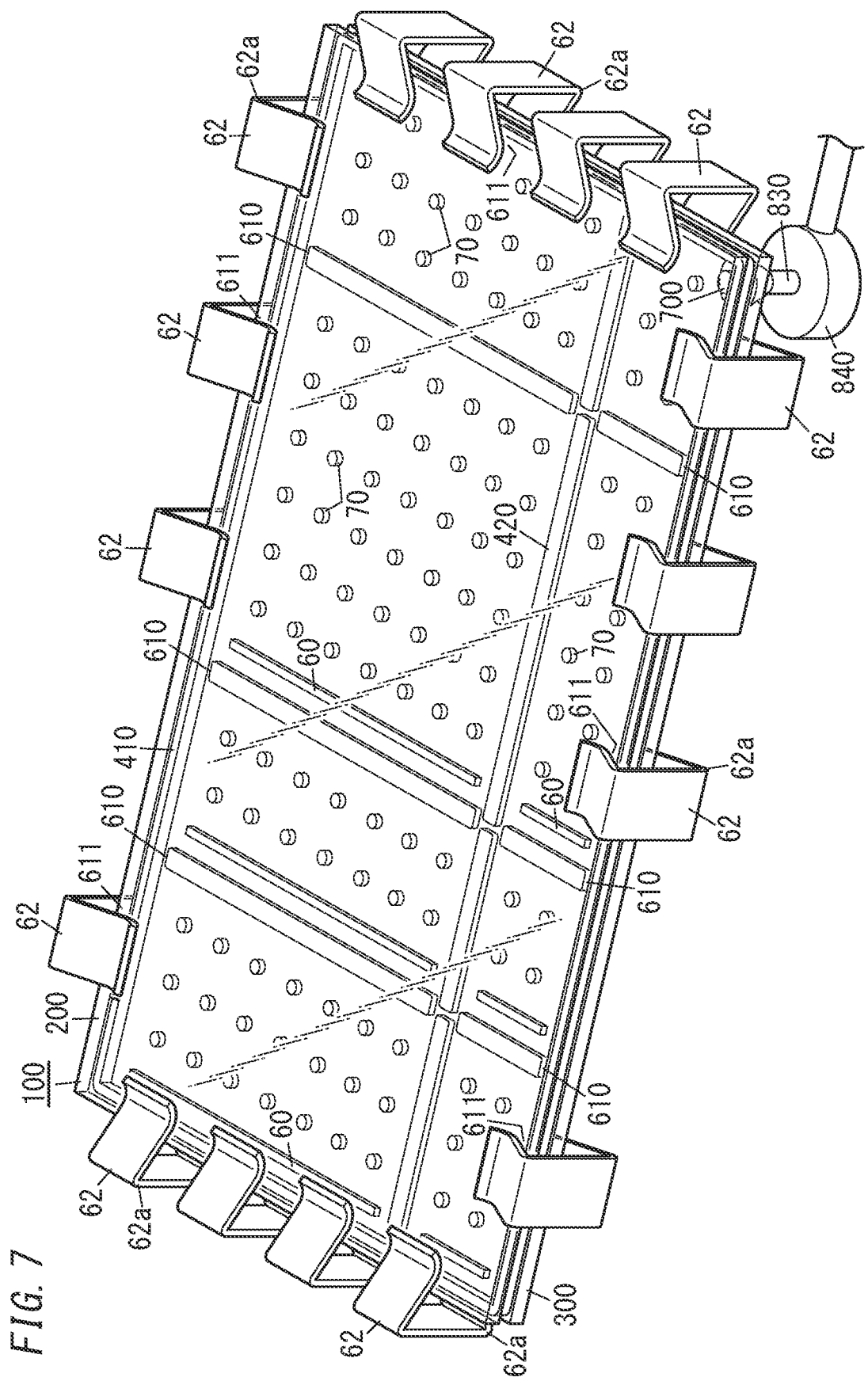
FIG. 7 is a view illustrating an installation step in the production method.

The determining step is a step of determining that each of the plurality of holder installation areas 61 is a first area 611 or a second area 612 (FIGS. 6 and 7). The second area 612 is an area in which the slit 610 and the partition 420 are adjacent to each other. Moreover, the first area 611 is an area in which the slit 610 and the partition 420 are not adjacent to each other. The first area 611 is set at a plurality of (in the example of FIG. 6, 16) locations along the outer peripheral edge of the peripheral wall 410. Specifically, each first area 611 is an area in which the pillar 70 or the gas adsorbent 60 and the peripheral wall 410 are adjacent to each other. In this case, an area in which the pillar 70 or the gas adsorbent 60 is adjacent to the peripheral wall 410 and the peripheral wall 410 and the slit 610 are adjacent to each other is defined as the second area 612. After the determining step, the installation step is performed.

The installation step is a step of providing the holders 62 in the first areas 611 without providing the holders 62 in the second areas 612. The holders 62 are made of a durable material in the first melting step, the evacuation step, and the second melting step. The material for the holder 62 is, for example, metal. The holder 62 has a structure that gives its clamping force to both outer surfaces of the first and second glass panes 200 and 300. Each holder 62 includes a spring mechanism 62*a*. The clamping force of the holder 62 is generated by the spring mechanism 62*a*. Examples of the spring mechanism 62*a* include a plate spring and a coil spring. Examples of the holder 62 include a clip. By not providing the holder 62 in the second area 612, the size of the slit 610 is not reduced in the installation step or steps subsequent thereto. Thus, evacuation in the evacuation step is more efficiency performed.

To provide the holder 62 in the first area 611, the holders 62 may be provided in all the first areas 611. Alternatively, the first areas 611 may include at least one first area in which the holder 62 is provided and at least one first area in which the holder 62 is not provided.

In the present embodiment, the first melting step, the evacuation step, and the second melting step are performed after the installation step.

The first melting step is a step of hermetically bonding the first and second glass panes 200 and 300 together with the peripheral wall 410 by once melting the peripheral wall 410. Specifically, the first glass pane 200 and the second glass pane 300 are placed in a melting furnace and are heated at a first melting temperature for a predetermined time (a first melting time). The first melting temperature and the first melting time are set such that the peripheral wall 410 hermetically bonds the first glass pane 200 and second glass pane 300 together but the partitions 420*a* to 420*j* do not close the air passages 600. That is, the lower limit of the first melting temperature is the softening point of the peripheral wall 410, but the upper limit of the first melting temperature is determined such that the air passages 600 are not closed with the partitions 420*a* to 420*j*. For example, when the softening point of the peripheral wall 410 and the partitions 420*a* to 420*j* is 434° C., the first melting temperature is set to 440° C. Moreover, the first melting time is, for example, 10 minutes. Moreover, in the first melting step, the peripheral wall 410 is softened, and therefore, the peripheral wall 410 itself no longer supports the first glass pane 200, and the first glass pane 200 is supported by the partitions 420*a* to 420*j*.

The evacuation step is a step of evacuating the first spaces 510*a* to 510*f* through the air passage 600, the second spaces 520*a* and 520*b*, and the evacuation port 700 such that the first spaces 510*a* to 510*f* become the vacuum space 50 (50*a* to 50*f*). In other words, the vacuum spaces 50*a* to 50*f* are respectively the first spaces 510*a* to 510*f* in each of which a vacuum is created. The evacuation is performed with, for example, a vacuum pump. As illustrated in FIG. 7, the vacuum pump is connected via an exhaust pipe 830 and a seal head 840 to the assembly 100. The exhaust pipe 830 is bound to the second glass pane 300, for example, such that the interior of the exhaust pipe 830 is in communication with the evacuation port 700. Then, the seal head 840 is attached to the exhaust pipe 830, thereby connecting an inlet of the vacuum pump to the evacuation port 700. The first melting step, the evacuation step, and the second melting step are performed with the assembly 100 being placed in a melting furnace. Thus, the exhaust pipe 830 is bonded to the second glass pane 300 at least before the first melting step.

In the evacuation step, the first spaces 510*a* to 510*f* are evacuated through the air passages 600, the second spaces 520*a* and 520*b*, and the evacuation port 700 at a temperature higher than or equal to the evacuation temperature for a predetermined time (evacuation time) before the second melting step is started. The evacuation temperature is set to be higher than the activation temperature (e.g., 350° C.) of the getter of the gas adsorbent 60 and to be lower than the softening point (e.g., 434° C.) of the partitions 420*a* to 420*j*. For example, the evacuation temperature is 390° C. In this way, the partitions 420*a* to 420*j* do not deform. Moreover, the getter in the gas adsorbent 60 is activated, and molecules (gas) adsorbed on the getter are released from the getter. Then, the molecules (i.e., gas) released from the getter is discharged through the first spaces 510*a* to 510*f*, the air passages 600, the second spaces 520*a* and 520*b*, and the evacuation port 700. Thus, in the evacuation step, the adsorption capacity of the gas adsorbent 60 is recovered. The evacuation time is set such that the vacuum spaces 50*a* to 50*f* having a desired degree of vacuum (e.g., degree of vacuum of lower than or equal to 0.1 Pa) are obtained. For example, the evacuation time is set to 120 minutes.

Figure 8:
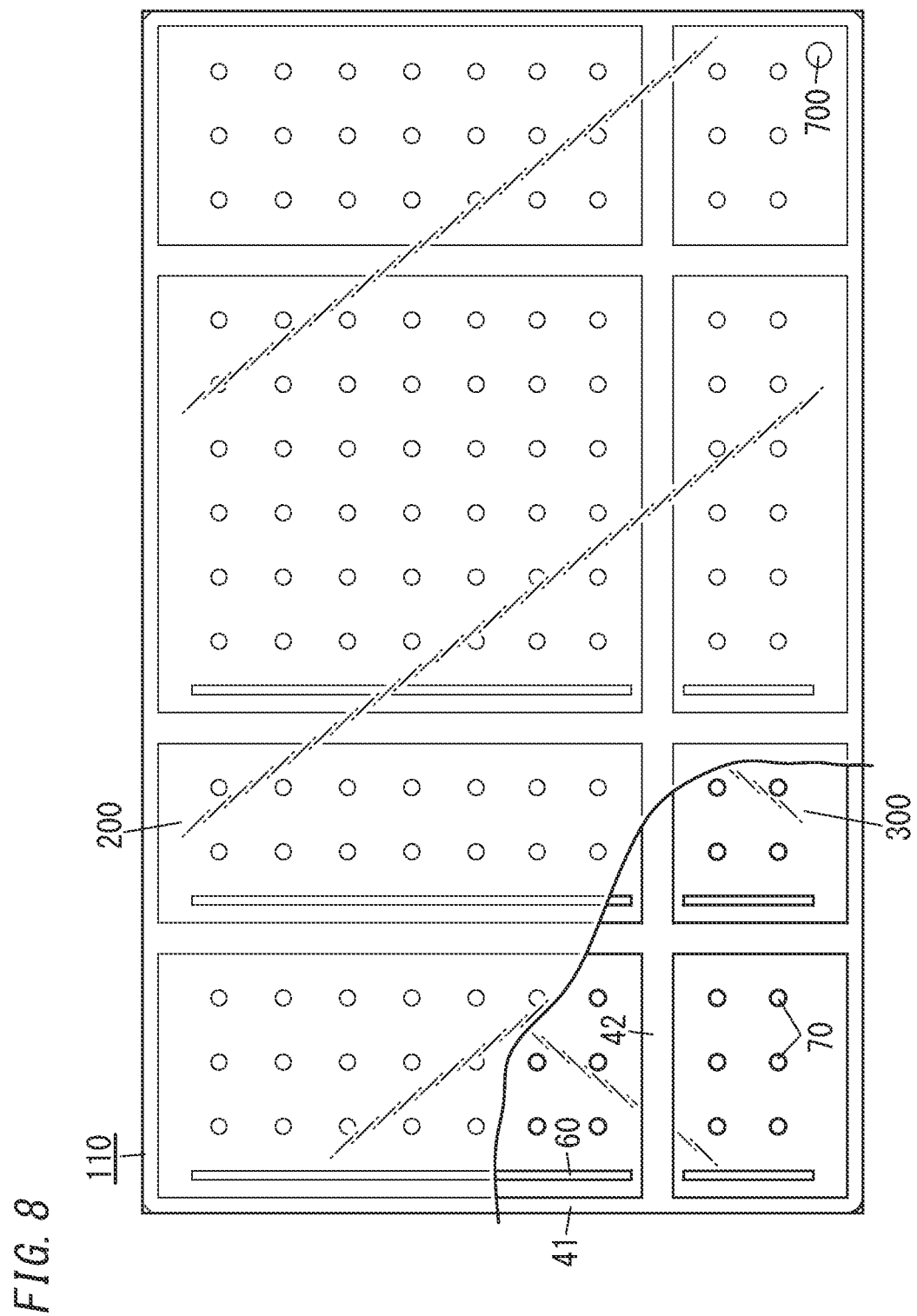
FIG. 8 is a view illustrating a state after the sealing step in the production method.

The second melting step is a step of obtaining the work in process 110 by deforming the partitions 420*a* to 420*j* to close the air passages 600 so as to form the partitions 42*a* to 42*d*. Moreover, in the second melting step, the air passage 600 is closed, thereby forming the respective frame members 40 surrounding the vacuum spaces 50*a* to 50*f*. Thus, as illustrated in FIGS. 3, 4, and 8, the partitions 42*a* to 42*d* are formed which hermetically divides the inside space 500 into the first spaces 510*a* to 510*f* (the vacuum spaces 50*a* to 50*f*) and the second spaces 520*a* and 520*b*. In other words, the second melting step is a step of forming the partitions 42*a* to 42*d* by deforming the partitions 420*a* to 420*j* to close the air passage 600. The partitions 42*a* to 42*d* hermetically divide the inside space 500 into the first spaces 510*a* to 510*f* and the second spaces 520*a* and 520*b*. Note that in the second melting step, the partitions 420*a* to 420*j* are softened, and therefore, the partitions 420*a* to 420*j* themselves no longer support the first glass pane 200, and the first glass pane 200 is supported by the pillars 70.

Specifically, the partitions 420*a* to 420*j* are once melted at a predetermined temperature (a second melting temperature) higher than or equal to the softening point of the partitions 420*a* to 420*j*, thereby deforming the partitions 420*a* to 420*j*. Specifically, the first glass pane 200 and the second glass pane 300 are placed in a melting furnace and are heated at the second melting temperature for a predetermined time (a second melting time). The second melting temperature and the second melting time are set such that the partitions 420*a* to 420*j* are softened and the air passage 600 are closed. The lower limit of the second melting temperature is the softening point (e.g., 434° C.) of the partitions 420*a* to 420*j*. For example, the second melting temperature is set to 460° C. Moreover, the second melting time is, for example, 30 minutes.

Also in the second melting step, evacuation of the inside space 500 is continued. That is, in the second melting step, while the first spaces 510a to 510f are evacuated at the second melting temperature through the air passages 600, the second spaces 520a and 520b, and the evacuation port 700, the partitions 420a to 420j are deformed to form the partitions 42a to 42d closing the air passages 600, Thus, degradation of the degree of vacuum in the vacuum spaces 50a to 50f during the second melting step is further reduced. Note that in the second melting step, the evacuation of the inside space 500 is not necessarily continued. Moreover, the second melting step may be a step of deforming the partitions 420a to 420j to close at least the air passages 600 other than the second slit 610b of the plurality of air passages 600. That is, the second slit 610b does not necessarily have to be closed. Note that the second slit 610b may be closed together with the other air passages 600.

The above-described preparation step provides the work in process 110 shown in FIGS. 3, 4, and 8, In the work in process 110, the peripheral wall 410 and the partitions 420a to 420j are once melted in the first melting step and the second melting step. Thus, the distance between first and second glass panes 200 and 300 is defined by the pillars 70 but not by the peripheral wall 410. That is, the peripheral wall 410 is compressed between the first and second glass panes 200 and 300 when melted, and the peripheral wall 41 lower than and wider than the peripheral wall 410 is formed. That is, the peripheral wall 41 is the peripheral wall 410 deformed in the sealing step (the second melting step). The sides 41a to 41d of the peripheral wall 41 are respectively lower than the sides 410a to 410d of the peripheral wall 410, and the sides 41a to 41d of the peripheral wall 41 are respectively wider than the sides 410a to 410d of the peripheral wall 410. Similarly, the partitions 420a to 420j are compressed between the first and second glass panes 200 and 300 when melted, thereby forming the partitions 42a to 42d. That is, the partition 42 (42a to 42d) is the partition 420 (420a to 420j) deformed in the sealing step (the second melting step). The partitions 42a to 42d are lower than the partitions 420a to 420j, and the partitions 42a to 42d are wider than the partitions 420a to 420j. Moreover, the partitions 420a to 420j are configured such that the width of each of the partitions 42a to 42d is greater than the width of the peripheral wall 410 (i.e., the peripheral wall 41) after the sealing step. Moreover, the partitions 420a to 420j are different from the peripheral wall 410 in height, but the same core materials are dispersed in the first bonding material and the second bonding material. Thus, the partitions 420a to 420j, the peripheral wall 41 formed from the peripheral wall 410, and the partitions 42a to 42d have the same height. Thus, the frame member 40 having a uniform height is obtained.

The removal step is performed after the preparation step. The removal step is a step of obtaining the glass panel units 10A to 10F from the work in process 110. The removal step is a step of removing a portion 11A having the second space 520a and a portion 11B having the second space 520b to obtain the glass panel units 10A to 10F. which are portions having the first spaces 510a to 510f (the vacuum spaces 50a to 50f). That is, in the removal step, the work in process 110 is cut and divided into glass panel units 10A to 10F. Since in the work in process 110, the glass panel units 10A to 10F are integrally formed, the work in process 110 is cut to separate the glass panel units 10A to 10F from one another.

As an example, as illustrated in FIG. 3, the work in process 110 (in particular, the first and second glass panes 200 and 300) are cut along cutting lines 910, 920, 930, and 940 respectively along the partitions 42a to 42d, Note that the cutting lines 910, 920, 930, and 940 extend through the centerline of the partitions 42a to 42d. That is, each of the partitions 42a to 42d is divided into two pieces in the width direction. Here, the partitions 42a to 42d are formed from the partitions 420a to 420j, and the partitions 420a to 420j are wider than each of the sides 410a to 410d of the peripheral wall 410. Thus, the partitions 42a to 42d are also wider than each of the sides 410a to 410d of the peripheral wall 410. Thus, the work in process 110 is easily cut along the partitions 42a to 42d, In particular, it is possible to reduce the possibility that the partitions 42a to 42d are damaged when the partitions 42a to 42d are cut, and the vacuum spaces 50a to 50f are thus communicated with the outside space, and the degree of vacuum is reduced. Thus, the yield is increased. Moreover, the width of the partitions 42a to 42d is respectively two times the width of the sides 41a to 41d of the peripheral wall 41. Thus, also when the frame member 40 includes part of the peripheral wall 41, the widths of the sides of the frame member 40 are equal to each other. Therefore, the strength of the frame member 40 is increased as a whole.

Moreover, in the present embodiment, the plurality of spacers 70 are arranged in the entirety of the inside space 500 (the first spaces 510a to 510f and the second spaces 520a and 520b). Thus, stress applied to the first and second glass panes 200 and 300 when the work in process 110 is cut is uniformly dispersed by a plurality of spacers, and it is possible to reduce the occurrence of damage to the first and second glass panes 200 and 300 and/or a cutting failure.

Figure 10:
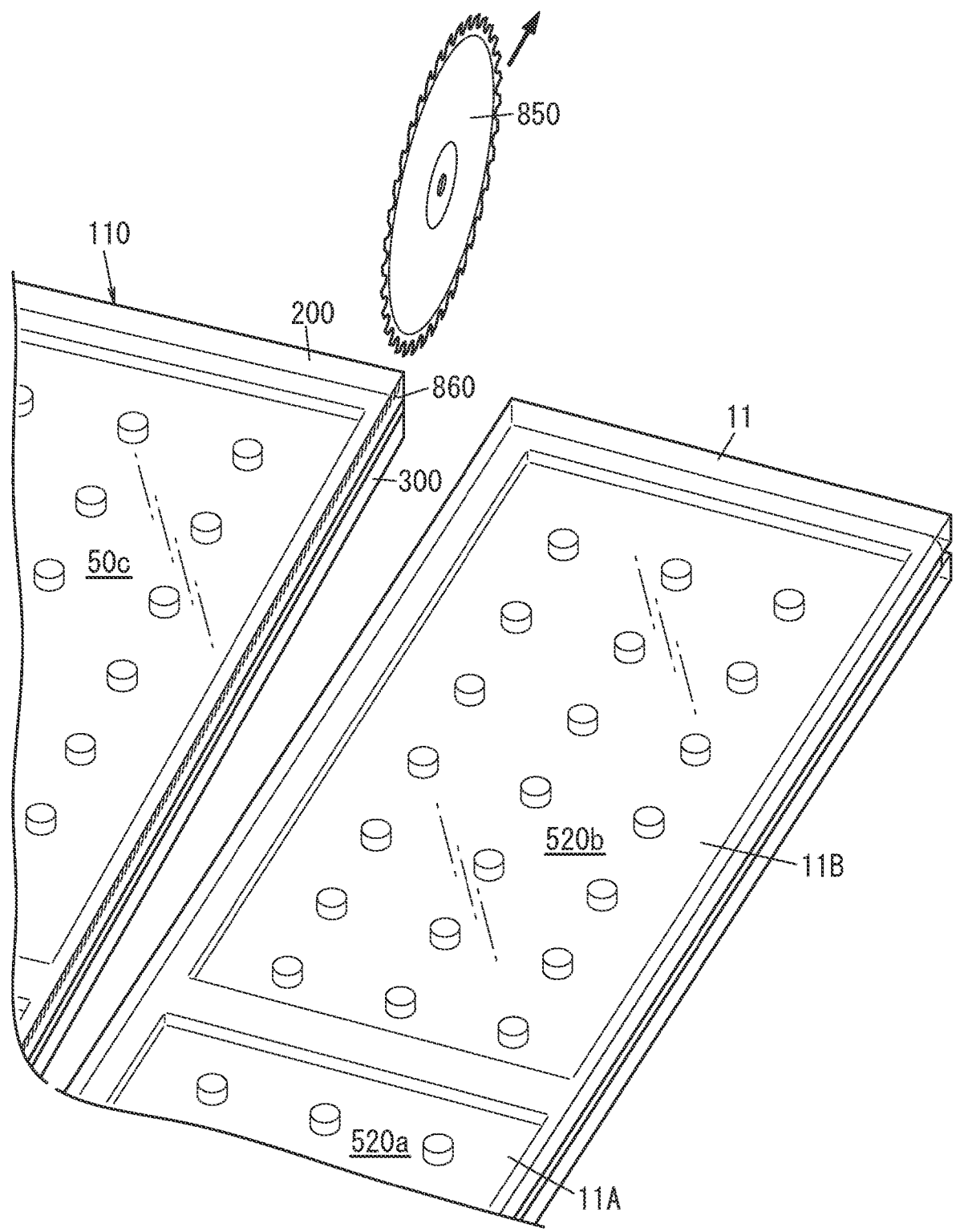
FIG. 10 is a view illustrating the removal step in the production method.
Figure 11:
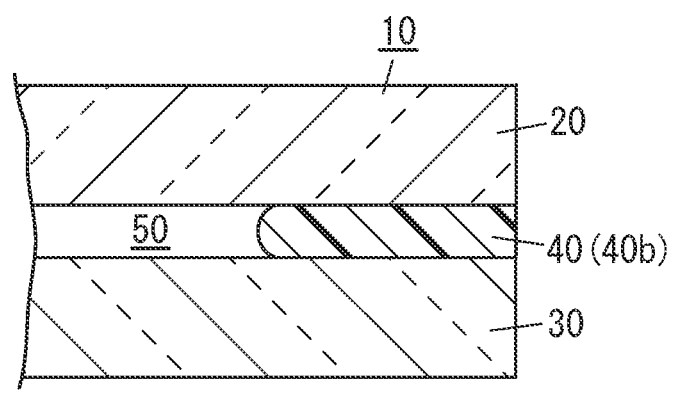
FIG. 11 is a sectional view illustrating part of a glass panel unit produced by the production method.
Figure 12:
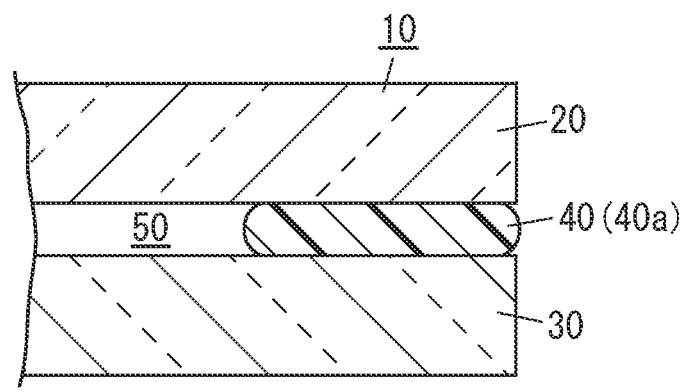
FIG. 12 is a sectional view illustrating part of a glass panel unit produced by the production method.
Figure 13:
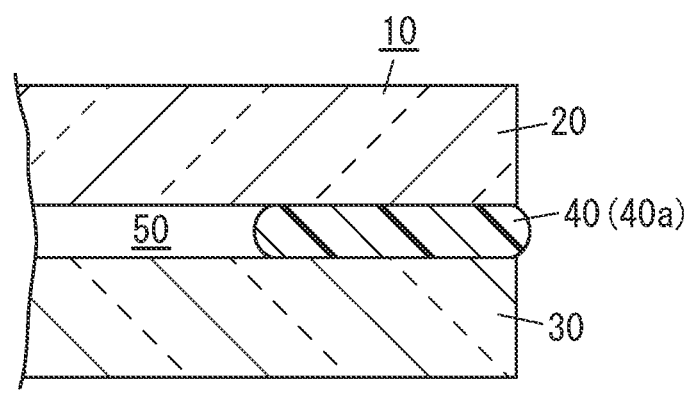
FIG. 13 is a sectional view illustrating part of a glass panel unit produced by the production method.

To cut the work in process 110, a cutter wheel 850 is used as illustrated in FIG. 10. FIG. 10 shows an example in which the work in process 110 is cut along the cutting line 910. When the cutting is performed with the cutter wheel 850, a rib mark 860 on the cut surface is observed. In FIG. 10, the work in process 110 is cut from a side at the first glass pane 200. Therefore, on the cut surface of the work in process 110, the rib mark 860 is formed on an opposite side of the first glass pane 200 from the second glass pane 300. In contrast, when the work in process 110 is cut from a side at the second glass pane 300, the rib mark 860 is formed, on the cut surface of the work in process 110, on an opposite side of the second glass pane 300 from the first glass pane 200. That is, when at least one of the plurality of side surfaces of the glass panel unit 10 is the cut surface and the rib mark 860 is provided, the glass panel unit 10 is a glass panel unit separated from the work in process 110. Here, whether or not the side surface of the glass panel unit 10 is the cut surface can be determined by checking the shape of the outer side surface of the frame member 40. When the side surface of the glass panel unit 10 is the cut surface, the outer side surface of the frame member 40 is a flat surface as illustrated in FIG. 11. In particular, the flat surface seems to be on the same plane as the side surfaces of the first and second glass panels 20 and 30. In contrast, when the side surface of the glass panel unit 10 is not the cut surface, the outer side surface of the frame member 40 is highly probably a convex surface as illustrated in FIGS. 12 and 13. In this case, the outer side surface of the frame member 40 may be recessed from the side surfaces of the first and second glass panels 20 and 30 toward the inner side of the glass panel unit 10 as illustrated in FIG. 12. In contrast, the outer side surface of the frame member 40 may protrude from the side surfaces of the first and second glass panels 20 and 30 toward the outer side of the glass panel unit 10 as illustrated in FIG. 13. Thus, the glass panel unit 10 obtained by the production method includes the first glass panel 20, the second glass panel 30, and the frame member 40 located between the first and second glass panels 20 and 30 and hermetically bonding the first and second glass panels 20 and 30 together. At least part of the outer side surface of the frame member 40 is a flat surface. In particular, in the glass panel units 10A to 10F, the frame member 40 includes a first part 40*a* (see FIGS. 12 and 13) having convex outer side surface and a second part 40*b* (see FIG. 11) having flat outer side surface. Here, the first part 40*a* is a part corresponding to the peripheral wall 41. The second part 40*b* is a part corresponding to the partition 42 (see FIG. 9). The width of the first part 40*a* is equal to the width of the second part 40*b*. However, the width of the first part 40*a* and the width of the second part 40*b* do not have to be exactly equal to each other, but are equal to each other at least to the extent that the width of the first part 40*a* and the width of the second part 40*b* appear the same to human eyes.

As illustrated in FIG. 9, the above-described removal step provides the glass panel units 10A to 10F. from the work in process 110. At this time, the portions 11 (11A, 11B) having the second spaces 520*a* and 520*b* are obtained, but these are not used.

2. Variations

The embodiment of the present disclosure is not limited to the above-described embodiment, Various modifications may be made to the embodiment depending on design and the like as long as the object of the present disclosure is achieved. Variations of the embodiment will be described below.

In the embodiment, the glass panel unit 10 has a rectangular shape, but the glass panel unit 10 may have a desired shape such as a round shape or a polygonal shape. That is, the first glass panel 20, the second glass panel 30, and the frame member 40 do not have to have a rectangular shape but may have a desired shape such as a round shape or a polygonal shape. Note that the shape of each of the first glass panel 200, the second glass panel 300, the peripheral wall 410, and the partition 420 is not limited to the shape in the embodiment but may be a shape that provides a glass panel unit 10 having a desired shape. Note that the shape and/or the size of the glass panel unit 10 are/is determined based on the application of the glass panel unit 10.

The first and second glass panels 20 and 30 do not have to have the same planar shape or the flat surface size or does not have to have the same thickness. Moreover, the first and second glass panels 20 and 30 do not have to be made of the same material. These points apply to the first and second glass panes 200 and 300.

The frame member 40 does not have to have the same planar shape as the first and second glass panels 20 and 30. Similarly, the peripheral walls 41 and 410 do not have to have the same planar shape as the first and second glass panes 200 and 300.

The first bonding material for the peripheral wall 410 (the peripheral wall 41) and the second bonding material for the partition 420*a* to 420*j* (the partitions 42*a* to 42*d*) do not have to contain the same core material but may contain different core materials. Moreover, the first bonding material may contain only the thermal adhesive, and the second bonding material may also contain only the thermal adhesive.

The partition 420 does not have to include the plurality of partitions 420*a* to 420*j*. That is, the assembly 100 includes one or more partitions 420.

The partitions 420*a* to 420*j* do not necessarily have to be lower than the peripheral 410. The height of the partition 420*a* to 420*j* may be greater than or equal to the height of the peripheral wall 410 (the height of the first side 410*a* to fourth side 410*d*), or the height of the partition 420*a* to 420*j* may be less than or equal to the height of the peripheral wall 410.

The partitions 420*a* to 420*j* do not necessarily have to be wider than the peripheral wall 410. The width of the partition 420*a* to 420*j* may be greater than or equal to the width of the peripheral wall 410 (the height of the first side 410*a* to fourth side 410*d*), or the width of the partition 420*a* to 420*j* may be less than or equal to the width of the peripheral wall 410. Moreover, the partitions 42*a* to 42*d* do not necessarily have to be wider than the peripheral wall 41. The width of the partition wall 42*a* to 42*d* may be greater than or equal to the width of the peripheral wall 41 (the height of the first side 41*a* to the fourth side 41*d*), or the width of the partition wall 42*a* to 42*d* may be less than or equal to the width of the peripheral wall 41.

Moreover, the assembly 100, the peripheral wall 410 is located between the first and second glass panes 200 and 300 but does not bond the first and second glass panes 200 and 300 together. However, at the stage of the assembly 100, the peripheral wall 410 may bond the first and second glass panes 200 and 300 together. In sum, in the assembly 100, the peripheral wall 410 is at least located between the first and second glass panes 200 and 300 but does not have to bond the first and second glass panes 200 and 300 together.

Moreover, in the above-described embodiment, the inside space 500 is divided into the plurality of first spaces 510*a* to 510*f* and the plurality of second spaces 520*a* and 520*b*. However, the inside space 500 may be partitioned by at least one partition into one or more first spaces and one or more second spaces.

In the above-described embodiment, a melting furnace is used to heat the peripheral wall 410, the gas adsorbent 60, and the partitions 420*a* to 420*j*. However, heating may be performed by an appropriate heating means. Examples of the heating means include a laser or a heat transfer board connected to a heat source.

In the above-described embodiment, the assembly 100 has the plurality of air passages 600 but may have one or more air passages 600. When the number of the air passage 600 is one, the air passage 600 is the slit 610 (610*a*).

In the above-described embodiment, the evacuation port 700 is formed in the second glass pane 300. However, the evacuation port 700 may be formed in the first glass pane 200 or in the peripheral wall 410 (the peripheral wall 41), In sum, the evacuation port 700 is at least formed to connect the second spaces 520*a* and 520*b* to the outside space.

In the above-described embodiment, the getter of the gas adsorbent 60 is an evaporable getter, but the getter may be a non-evaporable getter.

In the above-described embodiment, the gas adsorbent 60 has an elongated flat plate shape but may have another shape. Moreover, the gas adsorbent 60 does not have to be provided at an end of the vacuum space 50. Moreover, in the above-described embodiment, the gas adsorbent 60 is formed by applying a liquid containing powder of the getter (e.g., a dispersion obtained by dispersing the powder of the getter in a liquid, or a solution obtained by dissolving the power of the getter in a liquid). However, the gas adsorbent 60 may include a substrate and a getter fixed to the substrate. The gas adsorbent 60 is obtainable by immersing the substrate in a liquid containing power of the getter and then drying the substrate. Note that the substrate may have a desired shape and has, for example, an elongated rectangular shape. Alternatively, the gas adsorbent 60 may be a film entirely or partially formed on the surface of the second glass pane 300. The gas adsorbent 60 is obtained by coating the surface of the second glass pane 300 with a liquid containing power of the getter. Alternatively, the gas adsorbent 60 may be included in the pillars 70. For example, the pillars 70 is made of a material containing the getter, thereby providing pillars 70 containing the gas adsorbent 60. Alternatively, the gas adsorbent 60 may be a solid formed from the getter.

In the present embodiment, the plurality of spacers 70 are arranged in the entirety of the inside space 500 (the first spaces 510a to 510f and the second spaces 520a and 520b). However, it is not essential that the pillars 70 are arranged in the second spaces 520a and 520b. Moreover, the glass panel unit 10 includes the plurality of pillars 70, but the glass panel unit 10 may include one pillar 70. Alternatively, the glass panel unit 10 does not have to include the pillar 70.

In the above-described embodiment, the holder installation areas 61 are equidistantly spaced from each other on a side(s) of the peripheral wall 410, but the holder installation areas 61 do not have to be equidistantly spaced from each other. That is, the holder installation areas 61 do not have to be adjacent to each other at fixed intervals. Moreover, the set locations and the number of the holder installation areas 61 are arbitrarily changeable in accordance with the shape and the size of the assembly 100.

In the above-described embodiment, the determining step is performed after the setting step, but the determining step may be started in the course of the setting step.

In the above-described embodiment, the first spaces (510a to 5100 are the vacuum spaces (50a to 500 but may be depressurized spaces alternative to the vacuum spaces (50ato 50f). The depressurized spaces are the first spaces (510a to 510f) in which a depressurized state is created. The depressurized state is at least a state where the pressure is lower than the atmospheric pressure.

3. Aspects

As can be seen from the above-described embodiment and the variations, the present disclosure includes the below-described aspects. In the following description, signs in parentheses are added only to clarify the correspondence relationship to the embodiment.

A production method of a glass panel unit of a first aspect includes an assembling step, a setting step, a determining step, and an installation step. The assembling step is a step of preparing an assembly (100). The assembly (100) includes a first glass pane (200), a second glass pane (300), a peripheral wall (410), an inside space (500), a partition (420), an evacuation port (700), and an air passage (600). The second glass pane (300) faces the first glass pane (200). The peripheral wall (410) is located between the first glass pane (200) and the second glass pane (300). The peripheral wall (410) has a frame shape. The inside space (500) is surrounded by the first glass pane (200), the second glass pane (300), and the peripheral wall (410), The partition (420) divides the inside space (500) into a first space (510) and a second space (520). The evacuation port (700) connects the second space (520) to an outside space. The air passage (600) is configured such that the first space (510) is evacuated through the evacuation port (700), The air passage (600) has a slit (610). The slit (610) is in contact with an inner peripheral edge of the peripheral wall (410) and is disposed between the peripheral wall (410) and the partition (420). The setting step is a step of setting a plurality of holder installation areas (61) along an outer peripheral edge of the peripheral wall (410). The determining step is a step of determining that each of the plurality of holder installation areas (61) is a first area (611) or a second area (612). The slit (610) and the peripheral wall (410) are not adjacent to each other in the first area (611). The slit (610) and the peripheral wall (410) are adjacent to each other in the second area (612). The installation step is a step of providing a holder (62) in the first area (611) without providing the holder (62) in the second area (612).

According to the first aspect, the slit (610) is less likely to be narrowed due to the holder (62) provided.

In a method of a second aspect referring to the first aspect for manufacturing the glass panel unit, in the setting step, the plurality of holder installation areas (61) are set equidistantly spaced from each other on a side of the peripheral wall (410).

According to the second aspect, the locations of the plurality of holder installation areas (61) are efficiently set.

In a method of a third aspect referring to the first or second aspect for manufacturing the glass panel unit, the first area (611) includes a plurality of first areas along an outer peripheral edge of the peripheral wall (410).

According to the third aspect, the slit (610) is less likely to be narrowed due to the holder (62) provided.

In a method of a fourth aspect referring to the third aspect for manufacturing the glass panel unit, the holder (62) includes a plurality of holders, and the plurality of holders are disposed in all of the plurality of first areas (611).

According to the fourth aspect, the slit (610) is less likely to be narrowed due to the holder (62) provided.

A method of a fifth aspect referring to any one of the first to fourth aspects for manufacturing the glass panel unit further includes an evacuation step and a sealing step. The evacuation step is a step of evacuating the first space (510) through the air passage (600), the second space (520), and the evacuation port (700). The sealing step is a step of forming a partition (41) by deforming the partition (420) to close the air passage (600). The partition (420) hermetically divides the inside space (500) into the first space (510) and the second space (520).

According to fifth aspect, evacuation is efficiently performed.

A method of a sixth aspect referring to the fifth aspect for manufacturing the glass panel unit further includes a removal step. The removal step is a step of removing a portion (11) having the second space (520) to obtain a glass panel unit (10) which is a portion having the first space (510).

According to the sixth aspect, the glass panel unit (10) without the evacuation port (700) is obtained.

REFERENCE SIGNS LIST

100 ASSEMBLY OF GLASS PANEL UNIT
200 FIRST GLASS PANE
300 SECOND GLASS PANE,
410 PERIPHERAL WALL
420 PARTITION
500 INSIDE SPACE
510 FIRST SPACE
520 SECOND SPACE
600 AIR PASSAGE
610 SLIT
61 HOLDER INSTALLATION AREA
611 FIRST AREA
612 SECOND AREA
62 HOLDER
700 EVACUATION PORT
10 GLASS PANEL UNIT
11 PORTION

The invention claimed is:

1. A method for manufacturing a glass panel unit, the method comprising:
   an assembling step;
   a setting step;
   a determining step; and
   an installation step,
   the assembling step being a step of preparing an assembly, the assembly including
      a first glass pane,
      a second glass pane facing the first glass pane,
      a peripheral wall located between the first glass pane and the second glass pane and having a frame shape,
      an inside space surrounded by the first glass pane, the second glass pane, and the peripheral wall,
      a partition dividing the inside space into a first space and a second space,
   an evacuation port connecting the second space to an outside space, and
      an air passage configured such that the first space is evacuated through the evacuation port, the air passage having a slit, the slit being in contact with an inner peripheral edge of the peripheral wall and being disposed between the peripheral wall and the partition,
   the setting step being a step of setting a plurality of holder installation areas along an outer peripheral edge of the peripheral wall,
   the determining step being a step of determining that each of the plurality of holder installation areas is a first area or a second area, the slit and the peripheral wall not being adjacent to each other in the first area, the slit and the peripheral wall being adjacent to each other in the second area,
   the installation step being a step of providing a holder in the first area without providing the holder in the second area.

2. The method of claim 1, wherein
   in the setting step, the plurality of holder installation areas are set equidistantly spaced from each other on a side of the peripheral wall.

3. The method of claim 1, wherein
   the first area includes a plurality of first areas along an outer peripheral edge of the peripheral wall.

4. The method of claim 3, wherein
   the holder includes a plurality of holders, and the plurality of holders are disposed in all of the plurality of first areas.

5. The method of claim 1, further comprising:
   an evacuation step; and
   a sealing step, wherein
   the evacuation step is a step of evacuating the first space through the air passage, the second space, and the evacuation port, and
   the sealing step is a step of forming a partition by deforming the partition to close the air passage, the partition hermetically dividing the inside space into the first space and the second space.

6. The method of claim 5, further comprising a removal step, wherein
   the removal step is a step of removing a portion having the second space to obtain a glass panel unit which is a portion having the first space.

7. The method of claim 2, wherein
   the first area includes a plurality of first areas along an outer peripheral edge of the peripheral wall.

8. The method of claim 7, wherein
   the holder includes a plurality of holders, and the plurality of holders are disposed in all of the plurality of first areas.

9. The method of claim 2, further comprising:
   an evacuation step; and
   a sealing step, wherein
   the evacuation step is a step of evacuating the first space through the air passage, the second space, and the evacuation port, and
   the sealing step is a step of forming a partition by deforming the partition to close the air passage, the partition hermetically dividing the inside space into the first space and the second space.

10. The method of claim 3, further comprising:
    an evacuation step; and
    a sealing step, wherein
    the evacuation step is a step of evacuating the first space through the air passage, the second space, and the evacuation port, and
    the sealing step is a step of forming a partition by deforming the partition to close the air passage, the partition hermetically dividing the inside space into the first space and the second space.

11. The method of claim 4, further comprising:
    an evacuation step; and
    a sealing step, wherein
    the evacuation step is a step of evacuating the first space through the air passage, the second space, and the evacuation port, and
    the sealing step is a step of forming a partition by deforming the partition to close the air passage, the partition hermetically dividing the inside space into the first space and the second space.

12. The method of claim 7, further comprising:
    an evacuation step; and
    a sealing step, wherein
    the evacuation step is a step of evacuating the first space through the air passage, the second space, and the evacuation port, and
    the sealing step is a step of forming a partition by deforming the partition to close the air passage, the partition hermetically dividing the inside space into the first space and the second space.

13. The method of claim 8, further comprising:
    an evacuation step; and
    a sealing step, wherein
    the evacuation step is a step of evacuating the first space through the air passage, the second space, and the evacuation port, and
    the sealing step is a step of forming a partition by deforming the partition to close the air passage, the partition hermetically dividing the inside space into the first space and the second space.

14. The method of claim 9, further comprising a removal step, wherein
    the removal step is a step of removing a portion having the second space to obtain a glass panel unit which is a portion having the first space.

15. The method of claim 10, further comprising a removal step, wherein
    the removal step is a step of removing a portion having the second space to obtain a glass panel unit which is a portion having the first space.

16. The method of claim 11, further comprising a removal step, wherein
the removal step is a step of removing a portion having the second space to obtain a glass panel unit which is a portion having the first space.

17. The method of claim 12, further comprising a removal step, wherein
the removal step is a step of removing a portion having the second space to obtain a glass panel unit which is a portion having the first space.

18. The method of claim 13, further comprising a removal step, wherein
the removal step is a step of removing a portion having the second space to obtain a glass panel unit which is a portion having the first space.

\* \* \* \* \*